J. J. KEANE.
RAILWAY TRAIN PIPE HOSE COUPLING.
APPLICATION FILED JULY 27, 1917.
1,250,895. Patented Dec. 18, 1917.
2 SHEETS—SHEET 2.
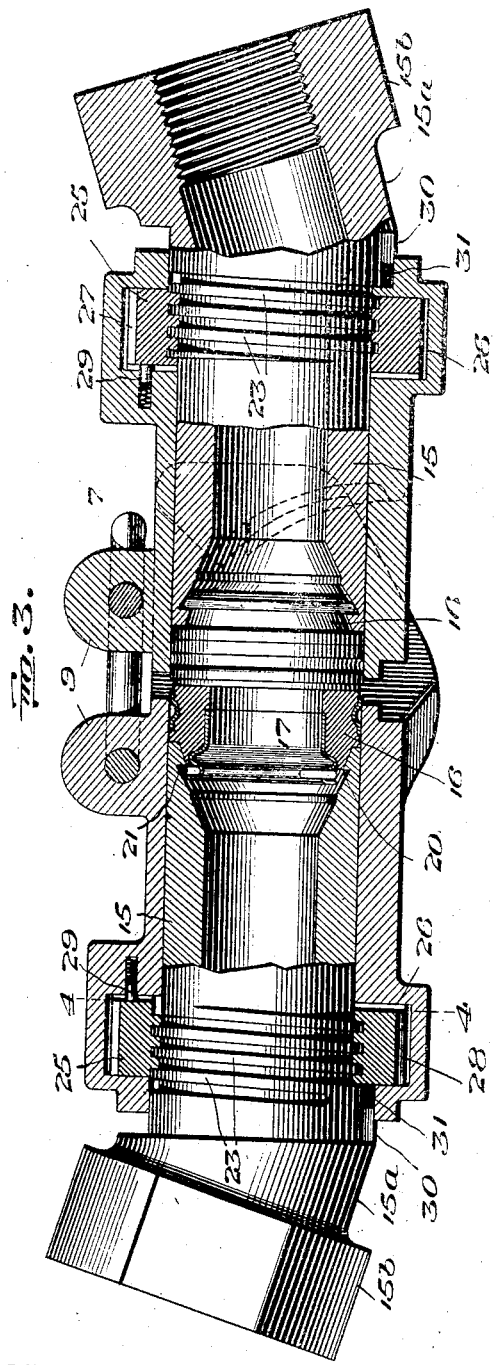
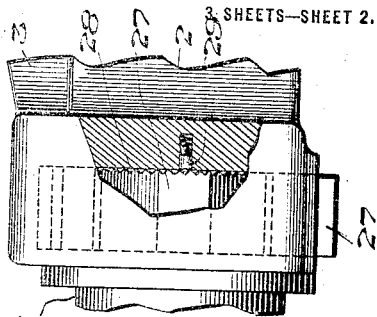
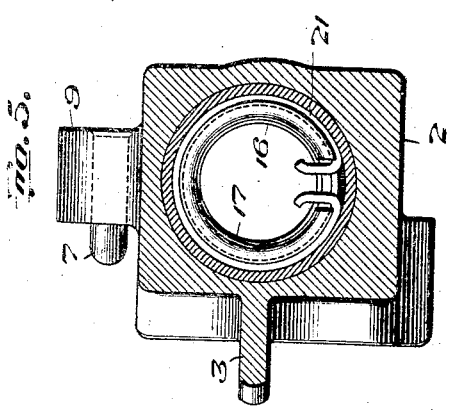
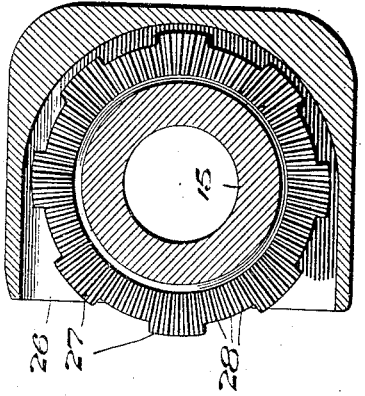
Witness
Philip E. Barnes
Inventor
John J. Keane
By Eugene C. Brown
Attorney

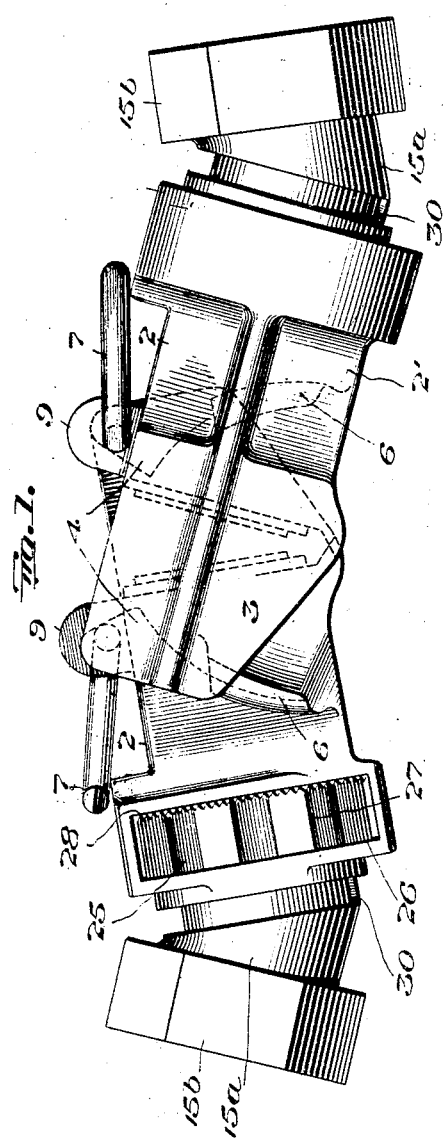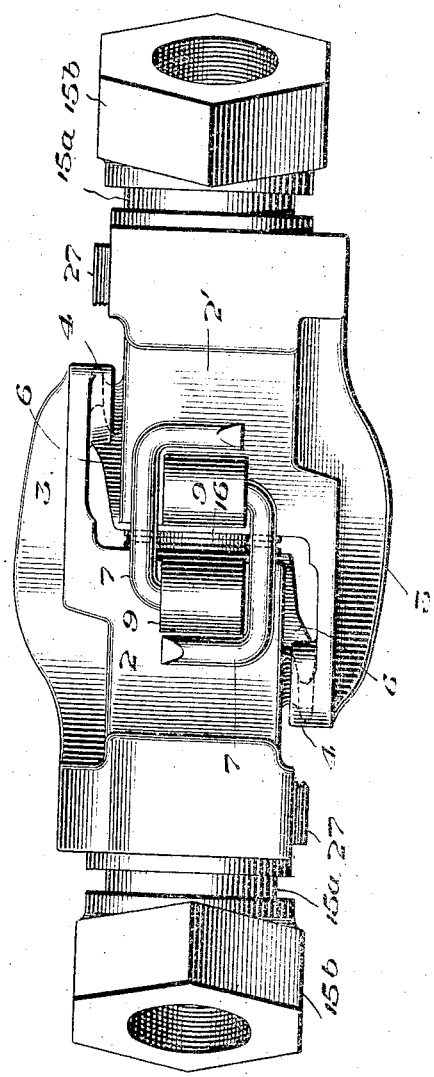

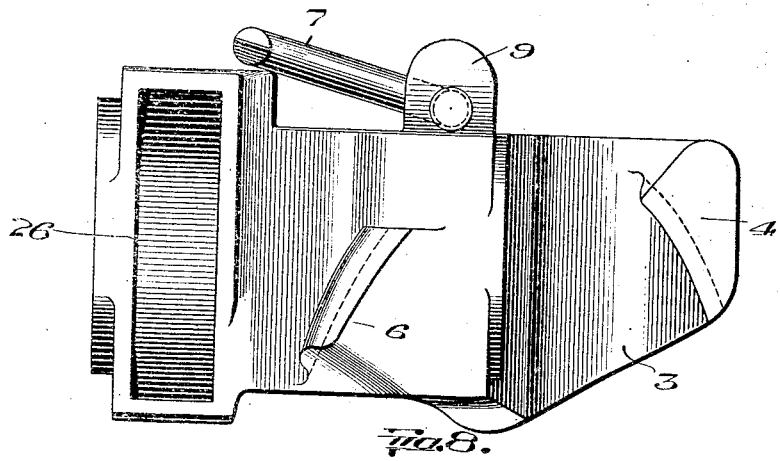
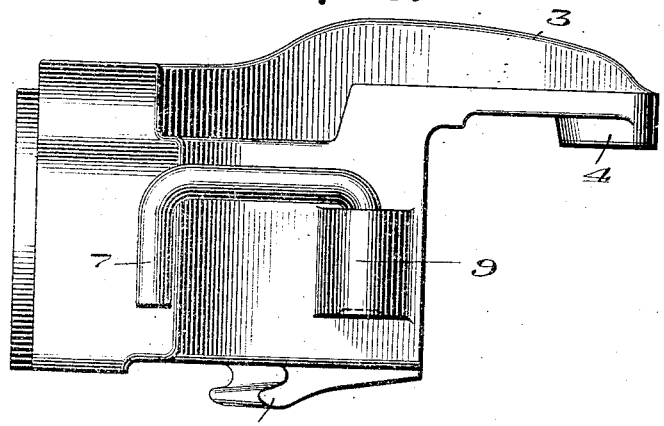
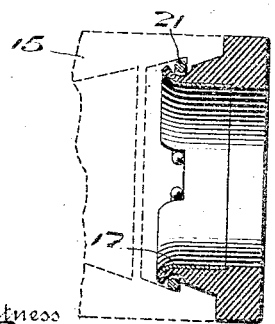
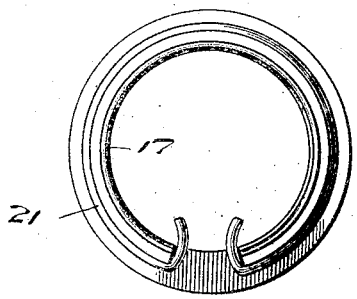

UNITED STATES PATENT OFFICE.

JOHN J. KEANE, OF ST. LOUIS, MISSOURI.

RAILWAY TRAIN-PIPE-HOSE COUPLING.

1,250,895.   Specification of Letters Patent.   Patented Dec. 18, 1917.

Application filed July 27, 1917. Serial No. 183,148.

*To all whom it may concern:*

Be it known that I, JOHN J. KEANE, a citizen of the United States, residing at St. Louis, in the county of St. Louis City and State of Missouri, have invented certain new and useful Improvements in Railway Train-Pipe-Hose Couplings, of which the following is a specification.

My invention relates to hose couplings and particularly to hose couplings of the gravity type, sometimes designated the "Sewall" type for use in connection with the steam train pipes of railway cars.

A primary object of my invention is to provide a coupling in which the gaskets may be maintained in proper position to form a tight joint and in which their position may be readily adjusted at any time to tighten the joint or to take up wear. If desired, the gaskets may be adjusted toward or from each other after the coupler heads have been interlocked.

The steam tight joint between the coupler heads is made by means of expansible gaskets which are constructed of certain graphite and rubber compositions, well known in the art.

In the accompanying drawings, Figure 1 is a side elevation of two mating hose couplers embodying my invention and shown in an abutting position at an angle ready to be interlocked; Fig. 2 is a top plan view of the same in interlocked relation; Fig. 3 is a longitudinal vertical section thereof; Figs. 4 and 5 are vertical sectional views on the lines 4—4 and 5—5, respectively, of Fig. 3; Fig. 6 is a fragmentary detail, partly in section; Fig. 7 is a side elevation of one of the coupler heads; Fig. 8 is a top plan view of the same; Fig. 9 is a longitudinal vertical sectional view of a gasket; and Fig. 10 is a rear elevation of the same.

The coupling comprises two mating coupler heads 2, 2' which are identical in construction, so that they are universal in use and permit the railroad cars to be coupled at either end. They may be made the standard size so that they may be coupled with any of the standard coupler heads of the usual standard "Sewall" type. Each coupler head is formed with an arm 3, provided with an undercut lug 4, which engages with an undercut lug 6 on the side of the complemental head. The manner of coupling a pair of coupler heads is well understood, the heads being brought together at an angle in the manner illustrated in Fig. 1, and then permitted to swing down into a horizontal position with the complemental undercut lugs engaging. The weight of the heads will hold them in interlocked relation, but in order that they may not become inadvertently lifted and uncoupled, I may provide each head with a U-shape locking pin 7, swiveled in an aperture in a lug 9, projecting from the head, each pin being adapted to swing over the lug upon the complemental head in the manner shown in Fig. 2.

As previously stated, the main purpose of my invention is to provide a means for supporting the gaskets in a manner permitting of longitudinal adjustment in the coupler head either before the heads have been coupled or after they have been interlocked. The gaskets are usually held rigidly in recesses in the meeting ends of the ports of the heads, the gaskets projecting slightly from the face of the head. When there is no provision for adjustment, the gaskets are frequently subjected to undue compression when the coupler heads are brought together and swung downwardly into interlocked position resulting in a flattening or distortion of the gaskets which shortens the life and impairs the efficiency of the gaskets when couplings containing such flattened gaskets are subsequently inter-coupled with other couplings.

It has been proposed to provide a yielding seat for the gaskets and to employ a cam or wedge member to move the gaskets into engagement after the heads are coupled. With such constructions, however, the tendency of the employee is to force or wedge the gaskets too tightly together, thereby mashing the meeting faces of the gaskets and frequently locking the coupler so tightly together that it can be unlocked only with difficulty. Furthermore when the gaskets are thus forced together by means of a cam member or wedge, as the steam is applied, the coefficient of expansion if the gaskets is such that they are squeezed out between adjacent faces of the coupling heads, thereby flattening and thinning the projecting faces of the gaskets and in some cases causing them to buckle inwardly, thereby obstructing the steam passage.

For the purpose of obviating the difficulties above pointed out I provide the coupler head with an enlarged bore extending from end to end and mount the gasket in the end of a tubular carrier or inner slidable sleeve 15, adjustable longitudinally therein. The bore of the sleeve or carrier is flared at one end to form a seat for the gasket 16 and is provided with an annular groove 20 to receive a retaining ring 21 surrounding the inner end of the gasket. The rear end of the sleeve member 15 is provided with means for attachment to the train hose and is preferably formed into a neck portion 15$^a$ extending angularly from the main part and threaded interiorly to receive the threaded union member on the end of the hose, the walls being thickened with a hexagonal periphery to constitute a nut which may be grasped in a wrench when the coupler member is being attached to the hose.

The sleeve is provided at an intermediate part with exterior threads 23 adapted to be engaged by the interiorly threaded adjusting member 25, which is housed in a recess 26 in an enlarged portion of the coupling member. The peripheral wall surrounding the recess 26, forms a cover to incase the adjusting member 25, so that it will be protected from the flying cinders and dust which is constantly stirred up in great quantities from the trackway by the motion of the train. This is quite important as the grit and dirt would otherwise sift into the joints and crevices between the adjusting member 25, and the sliding sleeve 15, and into the threaded part 23, and soon interfere with the movement of these parts. The periphery of the member 25 is preferably notched or provided with lugs 27 which project through the open side of the recess and may be engaged by the fingers of the operator or struck with a hammer or other tool for the purpose of turning the member. In order that the member 25 may remain in any adjusted position, I provide one face with radial teeth 28 to engage a spring-pressed dog or catch 29. Rotary movement of the sleeve is prevented by a lug 30, which slides in a notch or recess 31 in the coupler member.

The gaskets are preferably formed of a main body portion 16 made of a suitable composition of rubber and graphite molded to provide a thick outer annular portion and with a rearwardly tapering portion adapted to fit the seat in the end of the tubular carrier or sleeve member 15. The rear side may be reinforced with a metal bushing 17, which forms a partial lining through the bore of the gasket and a rearwardly extending grooved flange to form a seat for the retaining ring 21. The grooved flange is notched at 19 to provide for the ends of the ring which project into the bore or passage so that they may be grasped to contract the ring when the gasket is to be inserted or removed.

In operation the coupler members are interlocked in the well known manner by bringing them together at an angle, as shown in Fig. 1 so that the under cut lugs 4 of each coupler will be in position to engage the complementary lugs 6 on the sides of the other member, after which the members are dropped into horizontal position which locks them together with the bores in alinement. The links 7 may then be swung over the lugs 9 in the manner shown in Fig. 2 to prevent accidental uncoupling. If the sleeves 15 have been adjusted to bring the gaskets into their normal position, the adjacent faces of the gaskets will be closely juxtaposed but not tightly pressed together and consequently will not be subjected to compression or undue wear or abrasion during the coupling of the parts. As soon as the steam is passed through the hose, the gaskets will expand and form a tight joint. When the steam is turned off and the gaskets have become cold, they will be slightly separated, thereby permitting the escape of any water of condensation, thus preventing any accumulation of water which would be liable to freeze in cold weather. It further frequently happens that the gaskets are not accurately positioned with respect to each other in any two mating coupler heads, due to wear or various other causes and when couplers of different manufacture are brought together. In order to adjust the position of the gaskets in my coupler head, the adjusting member 25 is turned in one direction or the other to thereby slide the sleeve 15 longitudinally and thus adjust the position of the gasket with great accuracy. The parts will be held in their adjusted position by the spring catch or dog 29 which rides over the radial teeth 27 in the face of the member 25.

The advantages of my improvements in railway train hose couplers will be especially appreciated by railroad engineers and trainmen who have had experience with the present types of couplers in which great difficulty is encountered in providing steam tight joints because of improper fittitng of the gaskets and their liability to be crushed or distorted as well as on account of the excessive wear to which they are usually subjected. I have overcome these difficulties by providing the coupler with means for accurately adjusting the position of the gaskets either before the parts have been coupled or after they have been interlocked. The proper adjustment may be made instantly by any trainman or employee and without the use of any special tools. My coupler has very few parts and these may be strongly built so that no injury can result from rough usage. I have retained the advantage of a rigid seat for the gasket and have avoided the use of springs or other parts which are liable to break or get out of order and also of any cam member which must be thrown from one position to another to engage or disengage the gaskets, which are not only liable to require frequent inspection and become loose and inaccurate in their adjustments, but are also liable to place an undue compression upon the gaskets so that they will become distorted under the expansion caused by the steam heat.

I have described in detail the particular construction illustrated in the accompanying drawings for the purpose of disclosing an operative form of my invention, but it will be understood that various changes and modifications may be made within the scope of my claims. I have shown the adjusting member housed in a recess in the casting of the coupler head, but it will be evident that this member might be placed outside of the head, as between the neck portion and the head or upon the inner side between the meeting faces of the coupler heads if the head is cast with sufficient space upon the inner side. Other modifications will suggest themselves to engineers without departure from the principles of the invention.

The gaskets in the couplers now in common use very frequently become distorted or mashed during the uncoupling operation because this is usually done while the cars are in use and while the couplers are still hot. The gaskets are therefore expanded tightly together and as the coupler heads are swung to disengage the lugs, the gaskets are unduly compressed upon the lower side and become badly distorted. As a consequence they soon become unfit for use and fail to form a steam tight joint. My invention completely overcomes this difficulty by permitting the gaskets to be separated before the parts are uncoupled. It is only necessary for the trainman to give the adjusting members 25, a slight turn, which slides the sleeves 15 outwardly and separates the gaskets. The heads may then be uncoupled without any injury whatever to the gaskets. Likewise in coupling the coupler heads, the parts may be interlocked while the gaskets are withdrawn so that they will not come into contact during the coupling and then a slight turn of the adjusting members 25, will bring the gaskets into proper position so that the joint will be tight as soon as the steam is turned on. As previously pointed out, it is better to leave the gaskets very slightly separated when coupled cold to allow for the expansion of the gasket and thus prevent undue compression.

While I have shown, for the purpose of illustration, links 7 and lugs 9 over which they may be swung, as a means of preventing accidental uncoupling, yet as a matter of fact it is preferable not to employ such an auxiliary locking device and in actual use I prefer not to use any such device. When the coupler heads are coupled, the weight of the heads will insure the engagement of the complemental undercut lugs 4 and 6 but if the cars should become uncoupled, thereby placing a strain or pull upon the train pipe hose, the coupling heads will be slightly inclined upwardly and the lugs will be disengaged, permitting the coupler heads to become uncoupled. This is an advantage as it thereby prevents the breaking of the hose and for this reason an auxiliary locking means, such as the links 7 and lugs 9 is regarded as disadvantageous.

I claim:—

1. A railway train pipe hose coupling, comprising mating coupler heads, each having a longitudinal bore and a recess or pocket extending transversely thereof and having an opening at one side laterally of the head, a sleeve member slidably mounted therein and provided at its forward end with a seat for a gasket, and an adjusting device located in said recess and operatively connected to said sleeve to move it forward and backward in said bore and projecting laterally through said opening so that it may be manually operated.

2. A railway train pipe hose coupling, comprising mating coupler heads, each having a longitudinal bore and a recess or pocket extending transversely thereof, a sleeve member slidably mounted therein and provided at its forward end with a seat for a gasket and having exterior threads, an adjusting device located in said recess and threaded interiorly to engage the threads upon said sleeve, said adjusting device being adapted to bear against the forward or rear wall of said recess, whereby the rotation of said device causes the sleeve to move longitudinally in said bore, and means for holding said adjusting device in adjusted position.

3. A railway train pipe hose coupling, comprising mating coupler heads, each having a longitudinal bore and a recess or pocket extending transversely thereof and having a portion forming a housing thereover, a sleeve member slidably mounted therein and provided at its forward end with a seat to carry a gasket, and an adjusting device located in said recess and operatively connected to said sleeve and adapted to engage the front or rear wall of said recess so that when rotated it will move said sleeve member forward or backward in said bore.

In testimony whereof I affix my signature.

JOHN J. KEANE.